United States Patent [19]

Yoshikawa et al.

[11] Patent Number: 4,504,885
[45] Date of Patent: Mar. 12, 1985

[54] SWITCH BOARD

[75] Inventors: Isao Yoshikawa; Tooru Tanimizu; Sinzi Sugitani, all of Hitachi, Japan

[73] Assignee: Hitachi, Ltd., Tokyo, Japan

[21] Appl. No.: 486,831

[22] Filed: Apr. 20, 1983

[30] Foreign Application Priority Data

Apr. 23, 1982 [JP] Japan .................................. 57-67379

[51] Int. Cl.³ ............................................. H02B 1/04
[52] U.S. Cl. .................................... 361/342; 361/428
[58] Field of Search ............... 361/335, 338, 341, 342, 361/361, 363, 428, 429, 379; 200/50 AA

[56] References Cited

U.S. PATENT DOCUMENTS 2,563,441 8/1951 Wood et al. ......................... 361/336
3,495,135 2/1970 Paape .................................. 361/338
3,628,098 12/1971 Sturdivan ........................... 361/338
4,146,915 3/1979 Yosida ............................. 200/50 AA Primary Examiner—A. D. Pellinen
Assistant Examiner—Gregory D. Thompson
Attorney, Agent, or Firm—Antonelli, Terry & Wands

[57] ABSTRACT

A switch board with a casing thereof supported on right and left vertical supports includes a conduction chamber and an upper and lower electricity chambers with a partition wall therebetween. A drawer-type electric device is adapted to operate into and out of the electricity chambers, so that a secondary movable plug of the drawer-type electric device is connected and disconnected to a secondary control stationary plug in each of the electricity chambers. Control lines are connected between the secondary control stationary plug and the control terminal in the upper electricity chamber. Wiring ducts for containing the control lines include control ducts arranged along the ceiling of the casing from the control terminal, vertical ducts communicating with the right and left sides of the control duct, and horizontal ducts for connecting an end of the vertical ducts to the secondary control stationary plug of the upper electricity chamber and the other end thereof to the secondary control stationary plug of the lower electricity chamber.

17 Claims, 5 Drawing Figures

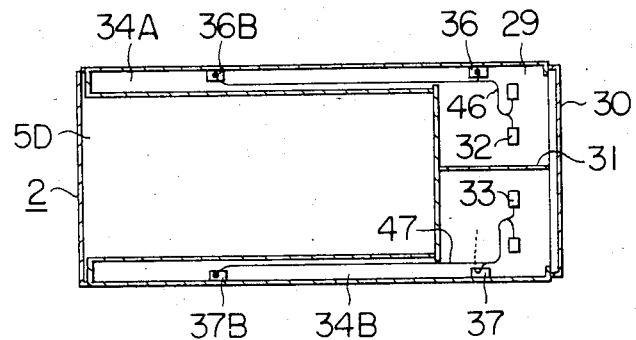
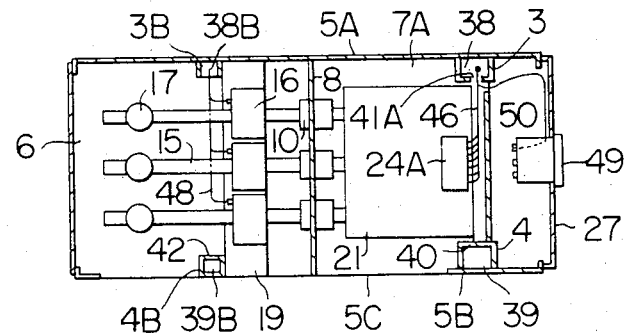
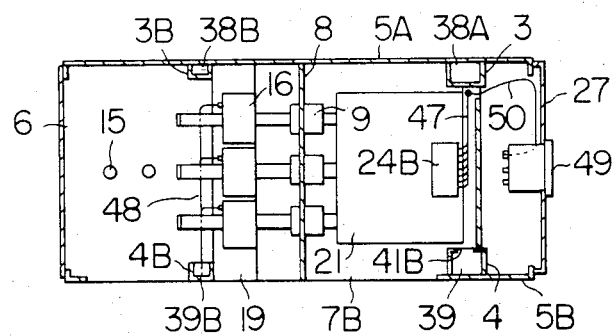

SWITCH BOARD

BACKGROUND OF THE INVENTION

The present invention relates to a switch board with an improved wiring duct containing control lines for communication between a conduction chamber and an electricity chamber formed in a switch box.

Generally, switch boards for a control center or an enclosed switch board are such that a drawer-type electric device such as a circuit breaker is drawn in and out of a switch box. The switch box includes a conduction chamber and an electricity chamber with a partition wall therebetween. The ends of a primary circuit breaker section provided on the partition wall are exposed to the conduction chamber and the electricity chamber. The conduction chamber accomodates a power bus and a load bus connected to an end of the primary circuit breaker section. The end of the primary circuit breaker section in the electricity chamber is adapted to be connected and disconnected with a primary contactor of the circuit breaker drawn in and out of the electricity chamber by way of an entrance. A secondary control stationary plug is mounted on the ceiling of the electricity chamber. The ceiling of the circuit breaker, on the other hand, carries a secondary movable plug adapted to be electrically connected and disconnected with the secondary control stationary plug. The secondary control stationary plug is connected to a control terminal board at the upper portion of the electricity chamber through a control line. The control terminal board is connected via the control lines to a current transformer, a zero-phase current transformer and other enclosed switch boards and central control board arranged along the load bus.

When the circuit breaker arrives at an operating position, the primary contactor is inserted into the primary circuit breaker section. If a closing command is issued from a remote central control board under this condition, the secondary movable plug and the secondary control stationary plug form an electric circuit to thereby close the main circuit of the circuit breaker such as a movable electrode and a fixed electrode connected with the primary contactor.

In the event that a shorting occurs on the load buses, the detection current detected by a current transformer is transmitted to the central control board. A breaking command from the central control board is applied through the secondary control stationary plug and the secondary movable plug to the circuit breaker thereby to trip off the circuit breaker.

In this way, scores of the control lines are used for connecting the secondary stationary plug, the current transformer, the zero-phase current transformer, the operating point detection switch and like electric devices with the control terminal board. In the case where the electricity chamber is divided into an upper and lower electricity chambers, the number of the control lines is increased to several hundreds. As a result, a control terminal board is provided in each of the electricity chambers. The control lines from the upper electricity chamber are connected to the electric devices along the side of the switch box, and the control lines from the control terminal board for the lower electricity chamber are connected to the electric devices along the same side as the control line for the upper electricity chamber.

This method of wiring the control lines is high in workability since the control lines for both the upper and lower electricity chambers are arranged on the same side. From another point of view, however, the workability may be low in that the control terminal boards are distributed in the upper and lower electricity chambers. This disadvantage is obviated by unifying and disposing the control terminal boards on the upper side of the upper electricity chamber. In that case, the control lines from the control terminal board are wired vertically downward on the same side of the switch box. This increases the diameter of the control lines and the sectional area of the wiring duct for the control lines, thus smoothing the air flow. If a shorting occurs on the load buses, for example, so that an arc, generated instantaneously, actuates the breaking operation of the circuit breaker, the flame due to the arc is transmitted to each electricity chamber through the control lines and also to the adjacent enclosed switch board, thus sometimes causing what is called the secondary damage. The fire is likely to extend outside the switch board through the load conductors, resulting in a serious accident.

The object of the present invention is to provide a switch board with control lines low in combustibility.

In order to achieve the above-mentioned object, the wiring ducts according to the present invention include control ducts arranged along the ceiling of a casing above the upper electricity chamber, vertical ducts arranged in vertical supports communicating with the right and left sides of the control ducts, and horizontal ducts for connecting an end of each of the right and left vertical ducts to the secondary control stationary plug of the upper electricity chamber and the other end of each of the right and left vertical ducts to the secondary control stationary plug of the lower electricity chamber. The wiring ducts of the electricity chambers are constructed independently of each other in detour, thereby deteriorating the air flow, with the result that the control lines are not easily burned.

The present invention will be apparent from the following detailed description taken in conjunction with the accompanying drawings, in which:

BRIEF DESCRIPTION OF THE DRAWINGS

FIGS. 3, 4 and 5 are sectional views taken in lines III—III, IV—IV and V—V respectively, in FIG. 1.

DETAILED DESCRIPTION

Figure 1:
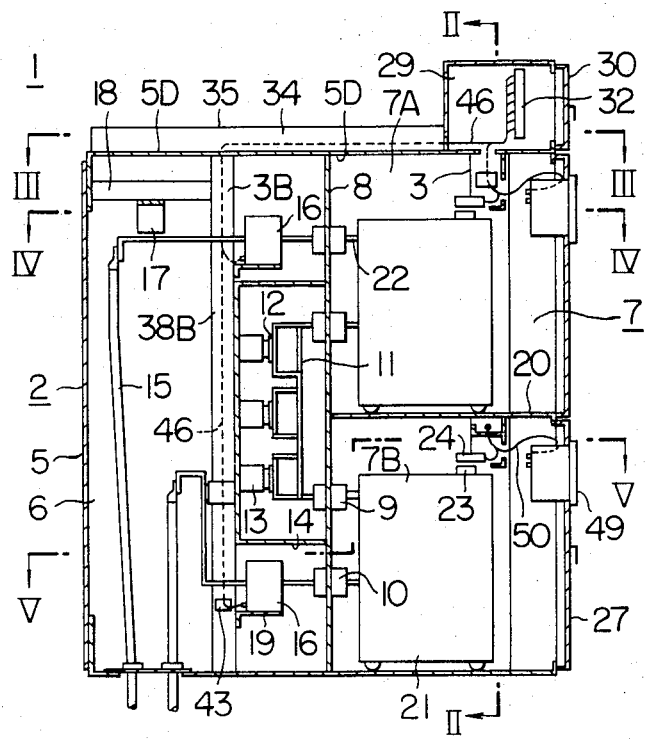
FIG. 1 is a side sectional view of a double-stage enclosed switch board according to an embodiment of the present invention.
Figure 2:
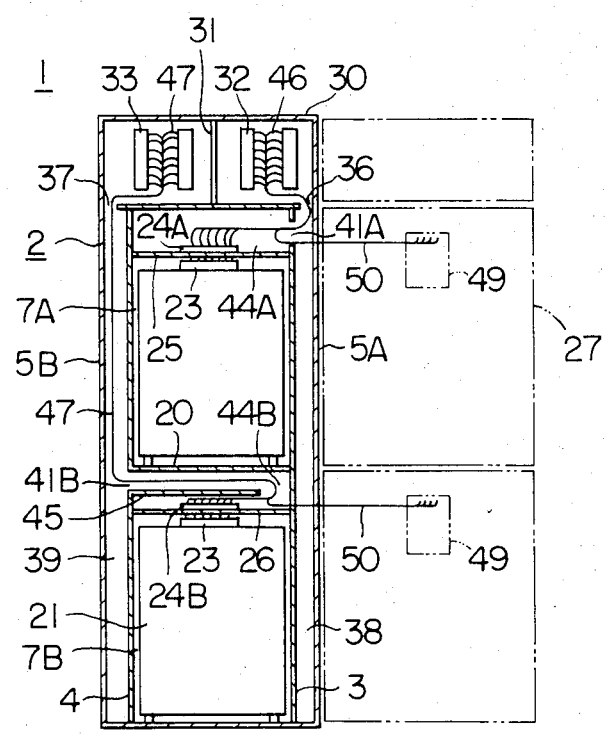
FIG. 2 is a sectional view taken in line II—II in FIG. 1.

Referring now to the drawings wherein like reference numerals are used throughout the various views to designate like parts and, more particularly, to FIGS. 1 and 2, according to these figures, a switch box generally designated by the reference numeral 2 comprises right and left vertical supports 3, 4 and a casing 5 of, for example, steel sheets welded to the outer sides of the vertical supports 3, 4. The vertical supports 3, 4 are formed as U-shaped members with an opening directed inward and having an openable cover described hereinbelow. A conduction chamber 6 and an electricity chamber 7 are formed on the rear and front sides in the switch box with a partition wall 8 therebetween. The partition wall 8 carries a three-phase primary circuit breaker section 9 at an intermediate part thereof and three-phase primary breaker sections 10 at the ends thereof.

The primary breaker section 9 on the conduction chamber side is connected through a branch conductor 11 to a power bus 12. The power bus 12 is supported on a support insulator 13. The support insulator 13 is, in turn, supported by a dash board 14. The dash board 14 has the ends thereof mounted on the partition wall 8 and surrounds the branch conductor 11 and the power bus 12. The other primary breaker section 10 is connected to a load conductor 15. The load conductor 15 is connected to a current transformer 16 and to load such as, for example, a motor located outside of the switch box. The support insulator 17 supporting a load conductor 15 and a current transformer 16 is supported by connecting plates 18 and 19 interposed between the right vertical support 3B and the left vertical support 4B (See FIGS. 4 and 5).

The electricity chamber 7 includes an upper electricity chamber 7A and a lower electricity chamber 7B with a mid plate 20 supported between the side plates 5A, 5B of the casing 5 and the partition wall 8. The side plate 5B, when arranged in opposition to an adjacent switch box not shown, forms a space 5C to save the material of the side plate 5B. With the circuit breaker 21 moved into and out of the electricity chambers, the primary contactor 22 of the circuit breaker 21 is electrically connected and disconnected with the primary breaker sections 9 and 10. The secondary movable plug 23, mounted on the ceiling of the circuit breaker 21, is electrically connected and disconnected with the secondary control stationary plug 24 as the circuit breaker is thrown in and out. The secondary control stationary plug 24 is supported by support plates 25 and 26 arranged in opposition to the top 5D of the casing 5 and the mid plate 20. The support plates 25 and 26 are supported between the front vertical supports 3 and 4. The switch box on the side of the electricity chamber 7, into and out of which the breaker 21 is thrown is provided with an openable door 27.

The control duct 29 built on the top 5D of the casing 5 is provided with an openable door 30 at an end thereof. Control terminal boards 32 and 33 are disposed in the space inside of the control board laterally divided by the dash board 31. A pair of the control ducts 34A and 34B, as shown in FIG. 3, have an end thereof communicating with the control duct 29 and are arranged from front to the rear on the top 5D. The upper cover 35 is detachably mounted on the control ducts 34A, 34B. Openings 36, 36B and 37, 37B are formed in the top 5D associated with the vertical supports 3, 3B and 4, 4B.

The vertical ducts 38, 38B and 39, 39B are formed with a vertical cover 40 detachably mounted on the openings of the vertical supports 3, 3B and 4, 4B and communicate with the openings 36, 36B and 37, 37B. Openings 41A, 41B and 42 are formed in the vertical cover 40 associated with the current transformer 16 and the secondary control stationary plugs 24A, 24B.

A horizontal duct 43 is provided between the support plate 25 and the top 5D associated with the opening 41A. The other horizontal duct 44 is interposed between the support plate 26 and the mid plate 20 associated with the opening 41B. A baffle board 45 is mounted on the vertical support 4 between the mid plate 20 and the support plate 26.

The control lines 46, 47 are connected from the control terminal boards 32, 33 through the control duct 29, the vertical ducts 38, 38B, 39, 39B and the horizontal ducts 43, 44 to the secondary control stationary plugs 24A, 24B. The secondary control line 48 of the current transformer 16 is connected through the opening 42 to the control lines 46 and 47 in the vertical ducts 38B and 39B. An instrument 49 mounted on the door 27 is connected to the control line 47 in the horizontal duct by a connecting wire 50.

The wiring ducts containing the control lines of this construction are such that the control line 46 from one of the control terminal boards 32 is bent rightward, inserted into the opening 36 and the right vertical duct and connected to the secondary control stationary plug 24A by being bent to the left in the horizontal duct from the opening 41A. The control 47 from the other control terminal board 33 is bent to the left at the opening 37 opposite to the control line 36, bent to the right in the horizontal duct from the opening 41B, and following a detour on the left side of the baffle plate 45 again, is connected to the secondary control stationary plug 24B. In this way, the vertical ducts 38, 39 and the horizontal ducts 44A, 44B are disposed on opposite sides completely independently of each other in the upper electricity chamber 7A and the lower electricity chamber 7B. Consequently, even if an arc is generated by a shorting which may occur in the lower electricity chamber 7B and the control line 47 is burnt, the fire is prevented from extending into the upper electricity chamber 7A. Thus, the upper electricity chamber 7A continues to be operated and the power substation is not stopped in operation. Further, in view of the fact that the vertical ducts 38, 39 and the horizontal ducts 44A, 44B are formed in a detour, the air does not easily ascend and the control lines are hard to burn. The upward air flow in the vertical and horizontal ducts are capable of being damped also by use of a baffle board at the parts in the ducts except where the control lines are inserted. In this case, closing covers are provided on the openings 36, 36B and 37, 37B for the convenience of the closing work.

The control line 46 is wired through the vertical duct 38 to the horizontal duct 44A, and the control line 47 is connected through the vertical duct 39 on the opposite side to the horizontal duct 44B, so that the worker is less likely to confuse the upper electricity chamber 7A with the lower electricity chamber 7B for connection of the control lines.

The control ducts 29, the vertical ducts 38, 39 and the horizontal ducts 44 have openings provided with the detachable upper cover 35 and vertical cover 40, and therefore the work for mounting the control lines 46, 47 is facilitated. This is especially true when additional switch boards are provided to increase the control lines, in which case all what is required is to remove the covers and contain the control lines therein.

According to the invention, the control terminal board is mounted on the switching box. Instead, the control terminal board may be located in each electricity chamber. The present invention of course applies with equal effect to a switch board of double or more stages.

It will be understood from the foregoing description that the wiring ducts according to the present invention are arranged independently in each electricity chamber in a detour, and therefore the control lines are not easily burnt, thereby preventing the secondary damage which otherwise might occur.

What is claimed is:

1. A switch board comprising a switch box with a casing thereof mounted on vertical supports erected on right and left sides, a conduction chamber and at least a pair of upper and lower electricity chambers with a partition wall having primary circuit breaker sections, said partition wall being located between said electricity chambers and said conduction chamber in said switch box, drawer-type electric devices thrown into and out of said electricity chamber, secondary control stationary plugs within said switch box adapted to connect and disconnect with a secondary movable plug each of said drawer-type electric devices, control lines connecting said secondary control stationary plug and control terminals mounted on said switch box, and wiring ducts containing said control lines; wherein said wiring ducts include control ducts having a control terminal arranged adjacent to the upper electricity chamber, an opening communicating with said vertical supports, vertical ducts communicating with said opening and located in said vertical supports, horizontal ducts connecting an end of said vertical ducts to said secondary control stationary plug of said lower electricity chamber and the other end of said vertical ducts to said secondary stationary plug of said lower electricity chamber.

2. A switch board according to claim 1, wherein said control ducts are mounted on the top of said casing making up said switch box.

3. A switch board according to claim 1 or 2, wherein the control lines for the upper electricity chamber are arranged on one side of the control duct divided by a dash board while the control lines for the lower electricity chamber are located on the other side of the control duct.

4. A switch board according to claim 1 or 2, wherein said control duct and said vertical ducts are provided with detachable covers.

5. A switch board according to claim 1 or 2, wherein a baffle board forms a detour of said control lines in said horizontal ducts.

6. A switch board according to claim 1 or 2, wherein a baffle board deteriorates the air flow in the opening of said control duct communicating with said vertical ducts.

7. A switch board according to claim 1 or 2, wherein a baffle board deteriorates the air flow in said vertical ducts.

8. A switch board according to claim 1, wherein said control terminal is arranged above the upper electricity chamber.

9. A switch board according to claim 3, wherein a baffle board forms a detour of said control lines in said horizontal ducts.

10. A switch board according to claim 4, wherein a baffle board forms a detour of said control lines in said horizontal ducts.

11. A switch board according to claim 3, wherein a baffle board deteriorates the air flow in the opening of said control duct communicating with said vertical ducts.

12. A switch board according to claim 4, wherein a baffle board deteriorates the air flow in the opening of said control duct communicating with said vertical ducts.

13. A switch board according to claim 5, wherein a baffle board deteriorates the air flow in the opening of said control duct communicating with said vertical ducts.

14. A switch board according to claim 3, wherein a baffle board deteriorates the air flow in said vertical ducts.

15. A switch board according to claim 4, wherein a baffle board deteriorates the air flow in said vertical ducts.

16. A switch board according to claim 5, wherein a baffle board deteriorates the air flow in said vertical ducts.

17. A switch board according to claim 6, wherein a baffle board deteriorates the air flow in said vertical ducts.

* * * * *